United States Patent
Anwar et al.

(10) Patent No.: US 7,271,814 B2
(45) Date of Patent: Sep. 18, 2007

(54) SYSTEMS AND METHODS FOR GENERATING VISUAL REPRESENTATIONS OF GRAPHICAL DATA AND DIGITAL DOCUMENT PROCESSING

(75) Inventors: Majid Anwar, Glasgow (GB); Brian Richard Pollock, Ayr (GB)

(73) Assignee: Picsel Technologies, Ltd., Glasgow (GB)

( * ) Notice: Subject to any disclaimer, the term of this patent is extended or adjusted under 35 U.S.C. 154(b) by 169 days.

(21) Appl. No.: 10/492,472

(22) PCT Filed: Oct. 10, 2002

(86) PCT No.: PCT/GB02/04598

§ 371 (c)(1), (2), (4) Date: Apr. 12, 2004

(87) PCT Pub. No.: WO03/034272

PCT Pub. Date: Apr. 24, 2003

(65) Prior Publication Data

US 2005/0017986 A1  Jan. 27, 2005

(30) Foreign Application Priority Data

Oct. 13, 2001 (GB) .................. 0124630.5

(51) Int. Cl.
*G09G 5/00* (2006.01)

(52) U.S. Cl. .............. 345/629; 345/634; 345/636; 345/637; 345/638; 345/660; 348/600; 382/284; 382/294; 382/302

(58) Field of Classification Search ........ 345/636–638; 348/597

See application file for complete search history.

(56) References Cited

U.S. PATENT DOCUMENTS

| | | | |
|---|---|---|---|
| 5,500,933 A | 3/1996 | Schnorf | 395/154 |
| 5,864,342 A * | 1/1999 | Kajiya et al. | 345/418 |
| 5,880,740 A | 3/1999 | Halliday et al. | 345/435 |
| 5,974,198 A * | 10/1999 | Hamburg et al. | 382/284 |
| 6,256,048 B1 | 7/2001 | Foster | 345/474 |
| 6,266,068 B1 | 7/2001 | Kang | 345/435 |
| 6,437,780 B1 * | 8/2002 | Baltaretu et al. | 345/423 |
| 6,700,588 B1 * | 3/2004 | MacInnis et al. | 345/629 |
| 2001/0030655 A1 * | 10/2001 | Anwar | 345/630 |
| 2001/0032221 A1 * | 10/2001 | Anwar | 707/527 |
| 2002/0030694 A1 * | 3/2002 | Ebihara et al. | 345/634 |

* cited by examiner

*Primary Examiner*—Kee M. Tung
*Assistant Examiner*—Antonio A Caschera
(74) *Attorney, Agent, or Firm*—Drinker Biddle & Reath LLP

(57) ABSTRACT

A method of blending a plurality of mutually overlapping graphical objects in a digital document processing system. The graphical objects are arranged in an ordered stack that includes at least one static object and at least one animated object. Each object has at least one associated blending parameter (e.g., transparency). The method comprises: (a) blending the content of the static objects to form at least one composite static object, taking account of the respective blending parameters of the static objects; and (b) blending the content of the animated object and the composite static object(s), taking account of the blending parameter(s) of the animated object.

48 Claims, 10 Drawing Sheets

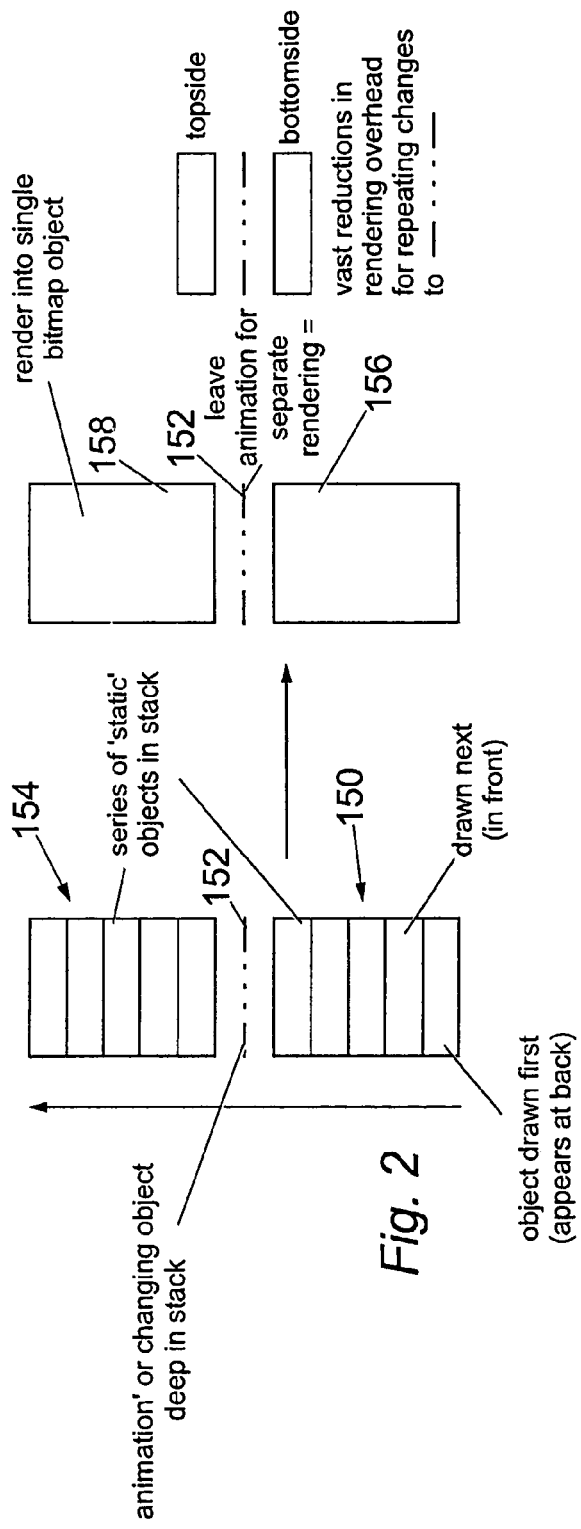
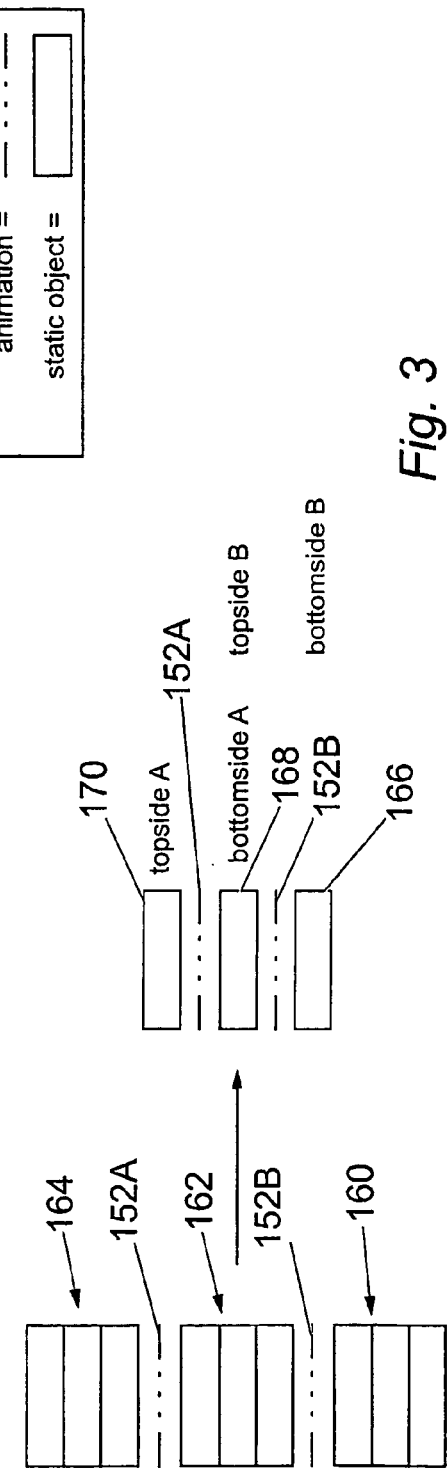
Fig. 2
Fig. 3

| Step [n] | Current display buffer content, d[n-1] | Current stencil buffer content, s[n-1] | Next object and alpha value | Resultant display buffer content, d[n] | Resultant stencil buffer content s[n] |
|---|---|---|---|---|---|
| [1] | I | 100% | A, 60% | 0.4I+0.6A | 100% |
| [2] | d[1] | 100% | B, 20% | 0.8d[1]+0.2B =0.32I+0.48A+0.2B | 100% |
| [3] | d[2] | 100% | C, 40% | 0.6d[2]+0.4C =0.192I+0.288A+ 0.12B | 100% |
| [4] | d[3] | 100% | D, 60% (anime) | 0.4d[3] =0.077I+0.115A+ 0.048B+0.16C | 0.6*100=60% |
| [5] | d[4] | 60% | E, 40% | 0.6d[4]+0.4E =0.046I+0.069A+ 0.029B+0.096C +0.4E | 0.6*60=36% |
| [6] | d[5] | 36% | F, 20% | 0.8d[5]+0.2F (=G) = 0.037I+0.055A+ 0.023B+0.077C+ 0.32E+0.2F | 0.8*36=28.8% (=H) |
| [7] | Final composite static bitmap, G | Final stencil value, H (s[6]) | Scale anime content by H | Add scaled anime content to G | |
| | d[6] | 28.8% | D* 28.8% | d[6]+0.288D = 0.037I+0.055A+ 0.023B+0.077C+ 0.32E+0.2F+0.288D | |

*Fig. 7*

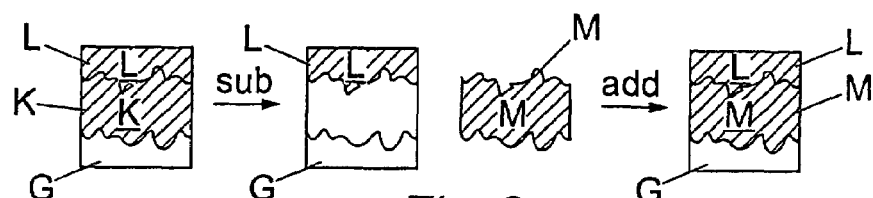

*Fig. 8*

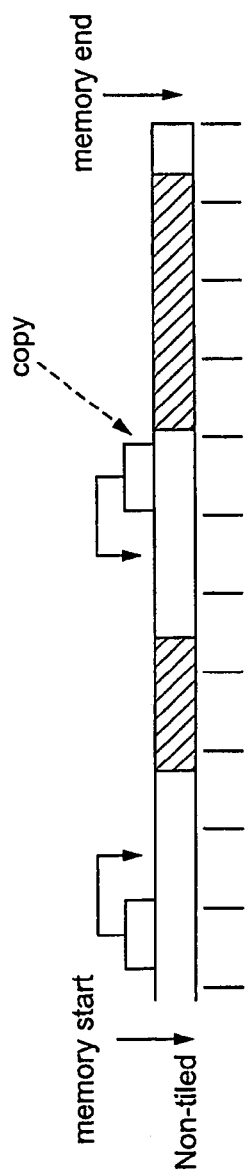
*Fig. 10A*
= unused (released) blocks
= large numbers of physical memory copy operations
= physical memory MMU
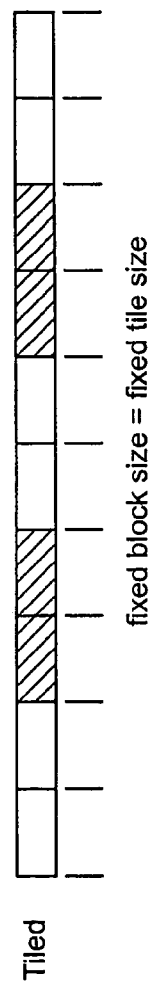
*Fig. 10B*

//SYSTEMS AND METHODS FOR GENERATING VISUAL REPRESENTATIONS OF GRAPHICAL DATA AND DIGITAL DOCUMENT PROCESSING

FIELD OF THE INVENTION

The invention relates to data processing methods and systems. More particularly, the invention relates to methods and systems for processing "graphical data" and "digital documents" (as defined herein) and to devices incorporating such methods and systems. In general terms, the invention is concerned with generating output representations of source data and documents; e.g. as a visual display or as hardcopy. More specifically, the invention concerns blending stacks of mutually overlaid graphical objects, including one or more animated objects, to produce a composite graphical output.

BACKGROUND OF THE INVENTION

As used herein, the terms "graphical data", "graphical object" and "digital document" are used to describe a digital representation of any type of data processed by a data processing system which is intended, ultimately, to be output in some form, in whole or in part, to a human user, typically by being displayed or reproduced visually (e.g. by means of a visual display unit or printer), or by text-to-speech conversion, etc. Such data, objects and documents may include any features capable of representation, including but not limited to the following: text; graphical images; animated graphical images; full motion video images; interactive icons, buttons, menus or hyperlinks. A digital document may also include non-visual elements such as audio (sound) elements. A digital document generally includes or consists of graphical data and/or at least one graphical object.

Data processing systems, such as personal computer systems, are typically required to process "digital documents", which may originate from any one of a number of local or remote sources and which may exist in any one of a wide variety of data formats ("file formats"). In order to generate an output version of the document, whether as a visual display or printed copy, for example, it is necessary for the computer system to interpret the original data file and to generate an output compatible with the relevant output device (e.g. monitor, or other visual display device, or printer). In general, this process will involve an application program adapted to interpret the data file, the operating system of the computer, a software "driver" specific to the desired output device and, in some cases (particularly for monitors or other visual display units), additional hardware in the form of an expansion card.

This conventional approach to the processing of digital documents in order to generate an output is inefficient in terms of hardware resources, software overheads and processing time, and is completely unsuitable for low power, portable data processing systems, including wireless telecommunication systems, or for low cost data processing systems such as network terminals, etc. Other problems are encountered in conventional digital document processing systems, including the need to configure multiple system components (including both hardware and software components) to interact in the desired manner, and inconsistencies in the processing of identical source material by different systems (e.g. differences in formatting, colour reproduction, etc). In addition, the conventional approach to digital document processing is unable to exploit the commonality and/or re-usability of file format components.

SUMMARY OF THE INVENTION

It is an object of the present invention to provide methods and systems for processing graphical data, graphical objects and digital documents, and devices incorporating such methods and systems, which obviate or mitigate the aforesaid disadvantages of conventional methods and systems.

The invention, in its various aspects, is defined in the Claims appended hereto. Further aspects and features of the invention will be apparent from the following description.

In a first aspect, the invention relates to a method of blending a plurality of mutually overlapping graphical objects in a digital document processing system, wherein said plurality of graphical objects is arranged in an ordered stack that includes at least one static object and at least one animated object, each of said objects comprising graphical content and having at least one blending parameter for at least part of the object associated therewith, the method comprising:

(a) blending the content of said static objects to form at least one composite static object, taking account of the respective blending parameters of the static objects; and (b) blending the content of the animated object and the or each composite static object, taking account of the blending parameter(s) of the animated object.

In typical embodiments of the invention, the at least one blending parameter of each object includes at least one alpha value representing the transparency of at least part of the object associated therewith.

In one preferred embodiment, step (a) comprises blending static objects located below an animated object in the stack to form a first composite static object and blending static objects located above the animated object in the stack to form a second composite static object, and step (b) includes blending the animated object with the first and second composite static objects.

In an alternative preferred embodiment, step (a) comprises blending the content of all of the static objects in the stack into a single composite static object, taking account of the relative blending parameters of all of the static and animated objects in the stack, and forming a blending parameter value stencil for the or each animated object in the stack, the blending parameter value(s) of the or each stencil taking account of the blending parameter value(s) of the corresponding animated object and of any objects above the corresponding animated object in the stack, and step (b) comprises blending the content of the or each animated object with the composite static object on the basis of the corresponding blending parameter value stencil.

In accordance with a second aspect of the invention, there is provided a digital document processing system adapted to implement the methods of the first aspect.

A preferred system in accordance with the second aspect of the invention comprises:

an input mechanism for receiving an input bytestream representing source data in one of a plurality of predetermined data formats;

an interpreting mechanism for interpreting said bytestream;

a converting mechanism for converting interpreted content from said bytestream into an internal representation data format; and a processing mechanism for processing said internal representation data so as to generate output representation data adapted to drive an output device.

In a further aspect, the invention relates to a graphical user interface for a data processing system in which interactive visual displays employed by the user interface are generated by means of a digital document processing system in accordance with the second aspect of the invention and to data processing systems incorporating such a graphical user interface.

In still further aspects, the invention relates to various types of device incorporating a digital document processing system in accordance with the second aspect of the invention, including hardware devices, data processing systems and peripheral devices.

Embodiments of the invention will now be described, by way of example only, with reference to the accompanying drawings.

BRIEF DESCRIPTION OF THE DRAWINGS

FIG. 2 is a diagram illustrating a first embodiment of a method for blending graphical objects in accordance with one aspect of the invention;

FIG. 3 is a diagram illustrating a further embodiment of a method for blending graphical objects in accordance with one aspect of the invention;

FIG. 7 is a table further illustrating the example of FIG. 6;

FIG. 8 is a diagram schematically illustrating the operation of the method of FIGS. 5 to 7 for adding and subtracting animated content to and from a composite graphical image.

FIG. 10A is a diagram illustrating memory allocation and fragmentation associated with conventional buffering methods;

FIG. 10B is a diagram illustrating memory allocation and fragmentation associated with tiling methods employed in preferred embodiments of the present invention;

DETAILED DESCRIPTION OF THE PREFERRED EMBODIMENT

Figure 1:
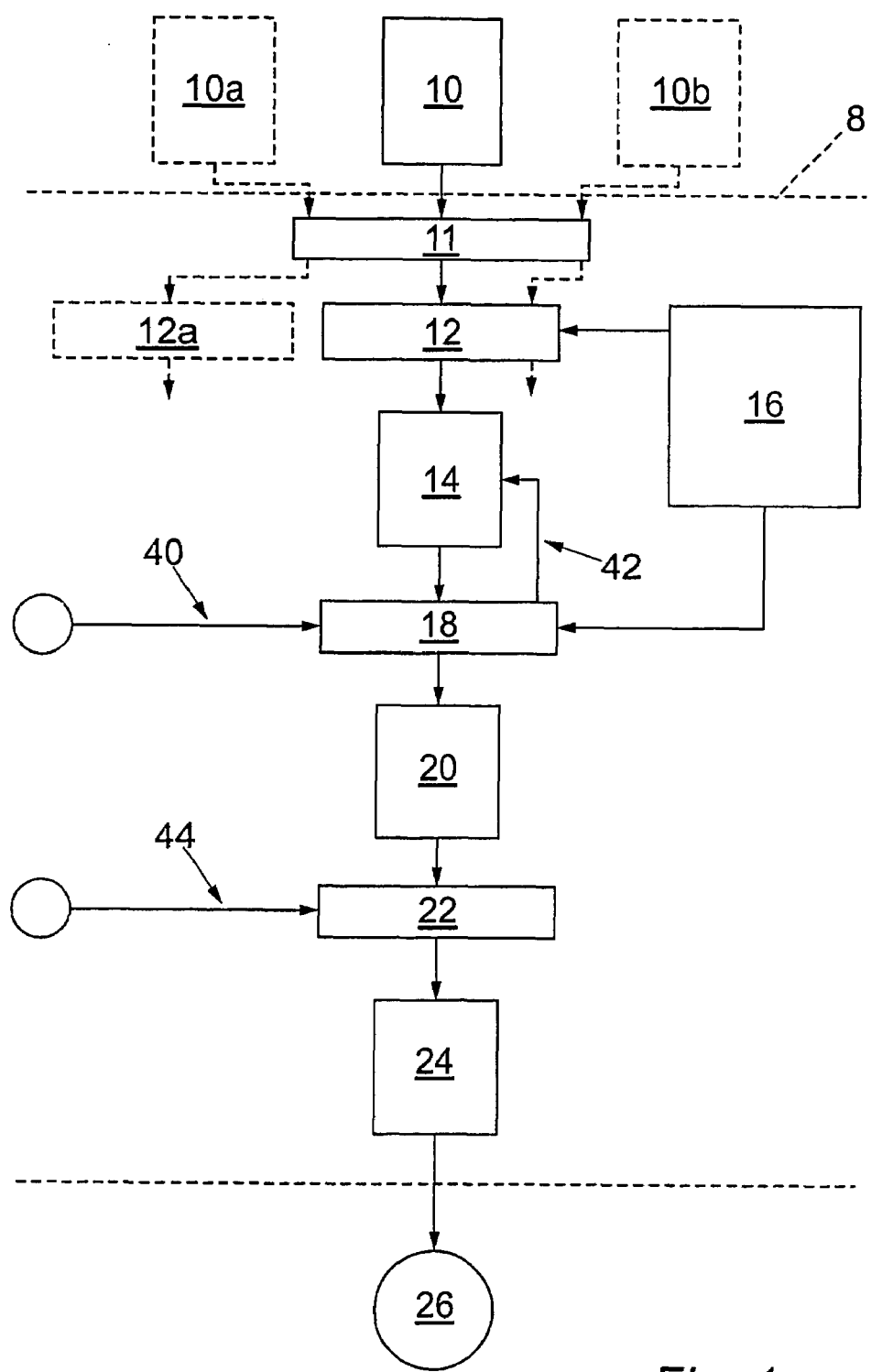
FIG. 1 is a block diagram illustrating an embodiment of a preferred digital document processing system which may be employed in implementing various aspects of the present invention.

Referring now to the drawings, FIG. 1 illustrates a preferred digital document processing system 8 in which the methods of the various aspects of the present invention may be implemented. Before describing the methods of the invention in detail, the system 8 will first be described by way of background. It will be understood that the methods of the present invention may be implemented in processing systems other than the system 8 as described herein.

In general terms, the system 8 will process one or more source documents 10 comprising data files in known formats. The input to the system 8 is a bytestream comprising the content of the source document. An input module 11 identifies the file format of the source document on the basis of any one of a variety of criteria, such as an explicit file-type identification within the document, from the file name (particularly the file name extension), or from known characteristics of the content of particular file types. The bytestream is input to a "document agent" 12, specific to the file format of the source document. The document agent 12 is adapted to interpret the incoming bytestream and to convert it into a standard format employed by the system 8, resulting in an internal representation 14 of the source data in a "native" format suitable for processing by the system 8. The system 8 will generally include a plurality of different document agents 12, each adapted to process one of a corresponding plurality of predetermined file formats.

The system 8 may also be applied to input received from an input device such as a digital camera or scanner. In this case the input bytestream may originate directly from the input device, rather than from a "source document" as such. However, the input bytestream will still be in a predictable data format suitable for processing by the system and, for the purposes of the system, input received from such an input device may be regarded as a "source document".

The document agent 12 employs a library 16 of standard objects to generate the internal representation 14, which describes the content of the source document in terms of a collection of generic objects whose types are as defined in the library 16, together with parameters defining the properties of specific instances of the various generic objects within the document. It will be understood that the internal representation may be saved/stored in a file format native to the system and that the range of possible source documents 10 input to the system 8 may include documents in the system's native file format. It is also possible for the internal representation 14 to be converted into any of a range of other file formats if required, using suitable conversion agents (not shown).

The generic objects employed in the internal representation 14 will typically include: text, bitmap graphics and vector graphics (which may or may not be animated and which may be two- or three-dimensional), video, audio, and a variety of types of interactive object such as buttons and icons. The parameters defining specific instances of generic objects will generally include dimensional co-ordinates defining the physical shape, size and location of the object and any relevant temporal data for defining objects whose properties vary with time (allowing the system to deal with dynamic document structures and/or display functions). For text objects, the parameters will normally also include a font and size to be applied to a character string. Object parameters may also define other properties, such as transparency.

The format of the internal representation 14 separates the "structure" (or "layout") of the documents, as described by the object types and their parameters, from the "content" of the various objects; e.g. the character string (content) of a text object is separated from the dimensional parameters of the object; the image data (content) of a graphic object is separated from its dimensional parameters. This allows document structures to be defined in a very compact manner and provides the option for content data to be stored remotely and to be fetched by the system only when needed.

The internal representation 14 describes the document and its constituent objects in terms of "high-level" descriptions.

The internal representation data 14 is input to a parsing and rendering module 18 which generates a context-specific representation 20 or "view" of the document represented by the internal representation 14. The required view may be of the whole document or of part(s) (subset(s)) thereof. The parser/renderer 18 receives view control inputs 40 which define the viewing context and any related temporal parameters of the specific document view which is to be generated. For example, the system may be required to generate a zoomed view of part of a document, and then to pan or scroll the zoomed view to display adjacent portions of the document. The view control inputs 40 are interpreted by the parser/renderer 18 in order to determine which parts of the internal representation are required for a particular view and how, when and for how long the view is to be displayed.

The context-specific representation/view 20 is expressed in terms of primitive shapes and parameters.

The parser/renderer 18 may also perform additional pre-processing functions on the relevant parts of the internal representation 14 when generating the required view 20 of the source document 10. The view representation 20 is input to a shape processor module 22 for final processing to generate a final output 24, in a format suitable for driving an output device 26 (or multiple output devices), such as a display device or printer.

The pre-processing functions of the parser/renderer 18 may include colour correction, resolution adjustment/enhancement and anti-aliasing. Resolution enhancement may comprise scaling functions which preserve the legibility of the content of objects when displayed or reproduced by the target output device. Resolution adjustment may be context-sensitive; e.g. the display resolution of particular objects may be reduced while the displayed document view is being panned or scrolled and increased when the document view is static.

There may be a feedback path 42 between the renderer/parser 18 and the internal representation 14; e.g. for the purpose of triggering an update of the content of the internal representation 14, such as in the case where the document 10 represented by the internal representation comprises a multi-frame animation.

The output representation 20 from the parser/renderer 18 expresses the document in terms of "primitive" objects. For each document object, the representation 20 preferably defines the object at least in terms of a physical, rectangular boundary box, the actual shape of the object bounded by the boundary box, the data content of the object, and its transparency.

The shape processor 22 interprets the representation 20 and converts it into an output frame format 24 appropriate to the target output device 26; e.g. a dot-map for a printer, vector instruction set for a plotter, or bitmap for a display device. An output control input 44 to the shape processor 22 defines the necessary parameters for the shape processor 22 to generate output 24 suitable for a particular output device 26.

The shape processor 22 preferably processes the objects defined by the view representation 20 in terms of "shape" (i.e. the outline shape of the object), "fill" (the data content of the object) and "alpha" (the transparency of the object), performs scaling and clipping appropriate to the required view and output device, and expresses the object in terms appropriate to the output device (typically in terms of pixels by scan conversion or the like, for most types of display device or printer).

The shape processor 22 preferably includes an edge buffer which defines the shape of an object in terms of scan-converted pixels, and preferably applies anti-aliasing to the outline shape. Anti-aliasing is preferably performed in a manner determined by the characteristics of the output device 26 (i.e. on the basis of the control input 44), by applying a grey-scale ramp across the object boundary. This approach enables memory efficient shape-clipping and shape-intersection processes.

A look-up table may be employed to define multiple tone response curves, allowing non-linear rendering control (gamma correction).

The individual objects processed by the shape processor 22 are combined in the composite output frame 24. The quality of the final output can also be controlled by the user via the output control input 44.

The shape processor 22 has a multi-stage pipeline architecture which lends itself to parallel processing of multiple objects, or of multiple documents, or of multiple subsets of one or more document, by using multiple instances of the shape processor pipeline. The pipeline architecture is also easily modified to include additional processing functions (e.g. filter functions) if required. Outputs from multiple shape processors 22 may generate multiple output frames 24 or may be combined in a single output frame 24.

The system architecture is modular in nature. This enables, for example, further document agents to be added as and when required, to deal with additional source file formats. The modular architecture also allows individual modules such as the library 16, parser/renderer 18 or shape processor 22 to be modified or upgraded without requiring changes to other modules.

The system architecture as a whole also lends itself to parallelism in whole or in part for simultaneous processing of multiple input documents 10a, 10b etc. or subsets of documents, in one or more file formats, via one or more document agents 12, 12a.

The integrated, modular nature of the system allows multiple instances of system modules to be spawned within a data processing system or device as and when required, limited only by available processing and memory resources.

The potential for flexible parallelism provided by the system as a whole and the shape processor 22 in particular allows the display path for a given device to be optimised for available bandwidth and memory. Display updates and animations may be improved, being quicker and requiring less memory. The object/parameter document model employed is deterministic and consistent. The system is fully scalable and allows multiple instances of the system across multiple CPUs.

The parser/renderer 18 and shape processor 22 interact dynamically in response to view control inputs 40, in a manner which optimises the use of available memory and bandwidth. This applies particularly to re-draw functions when driving a visual display, e.g. when the display is being scrolled or panned by a user.

The system may implement a scalable deferred re-draw model, such that the display resolution of a document view, or of one or more objects within a view, varies dynamically according to the manner in which the display is to be modified. This might typically involve an object being displayed at reduced resolution whilst being moved on-screen and being displayed at full resolution when at rest. The system may employ multiple levels of display quality for this purpose. Typically, this will involve pre-built, low resolution bitmap representations of document objects and/or dynamically built and scaled bitmaps, with or without interpolation. This approach provides a highly responsive display which makes best use of available memory/bandwidth.

The system described thus far may be adapted to implement methods provided by the present invention.

In accordance with the first aspect of the invention, there are provided methods for generating composite visual representations of a plurality of overlaid (i.e. at least partially overlapping) objects, at least one of which is an animated object, referred to herein as "blending" the objects. Blending is performed on the basis of at least one predetermined blending function. Each object has at least one blending parameter value associated therewith to which the at least one blending function is applied. The most common blending parameter to which the methods are applicable is transparency and the invention will be explained herein with particular reference to transparency. However, it will be understood that the invention is equally applicable to other blending parameters.

As used herein, "animated objects" includes objects the content of which (including data content and/or other visual properties and/or position and/or orientation, and/or shape and/or size) vary with time, periodically or aperiodically, in any manner and for any reason, including but not limited to video objects, frame-animated objects, and progressively updated graphic objects.

Also as used herein, "partially transparent object" means an object which is not completely opaque, and the term "alpha value" denotes a numerical value which indicates the relative transparency of an object or a part thereof, between complete transparency and complete opacity. Partial transparency also refers to anti-aliased "soft" edges of objects. "Static object" means an object whose content, (including position, orientation, shape, size and other relevant properties) does not vary during a time period of interest.

Referring now to FIG. 2, a system such as that of FIG. 1 may be required to generate a composite visual representation of an ordered stack of overlaid partially transparent graphical objects by combining the content of all of the objects, taking account of the relative transparencies (alpha values) of each object. If one of the objects in the stack is animated (as defined above), then each time the content of the animated object changes relative to the other objects it would normally be necessary to process the entire stack of objects in order to generate a new representation reflecting the updated content of the animated object.

In accordance with one embodiment of the invention, the object stack is split into clusters of static objects above and below an animated object (hereinafter referred to as an "anime"), in the order in which the objects are to be rendered. A bottomside cluster 150 consists of one or more objects which are below the anime 152 in the stack and a topside cluster 154 consists of one or more objects which are above the anime 152 in the stack. The bottomside cluster 150 is rendered/blended to produce a single bottomside bitmap object 156 and the topside cluster 154 is rendered/blended to produce a single topside bitmap object 158, and the anime 152 remains separate, located between the top and bottomside bitmaps. Then, it is only necessary to blend the two bitmap objects and the anime in order to obtain the required composite output each time the content of the anime 152 changes. That is, it is only necessary to blend the bottomside cluster objects once and the topside cluster objects once, providing a large reduction in the processing overhead for repeating changes in the anime 152.

It will be understood that the method is applicable even where one or more of the clusters consists of only a single static object, although the benefit of the method in saving processing overheads increases as the number of objects in each cluster increases.

It will also be understood that the method is applicable where the anime 152 is at the top of the stack (there is no topside cluster) or at the bottom of the stack (there is no bottomside cluster).

The anime 152 may have a clipmask (defining its shape) and an alphamask (defining its transparency) associated therewith. Similar masks may be used to define blending parameters other than transparency.

The method is also applicable where there are multiple animes within a stack, as shown in FIG. 3. Here, cluster 160 comprises the bottomside cluster for anime 152B, cluster 162 comprises the topside cluster for anime 152B and the bottomside cluster for anime 152A, and cluster 164 comprises the topside cluster for anime 152A, the clusters 160, 162 and 164 being blended respectively to corresponding single bitmap objects 166, 168 and 170. This type of "split-clustering" can be nested/repeated indefinitely for any number of animes within an object stack. It can be seen that the method is equally applicable where multiple animes are adjacent to one another within the stack, at the top of the stack or at the bottom of the stack.

Figure 4:
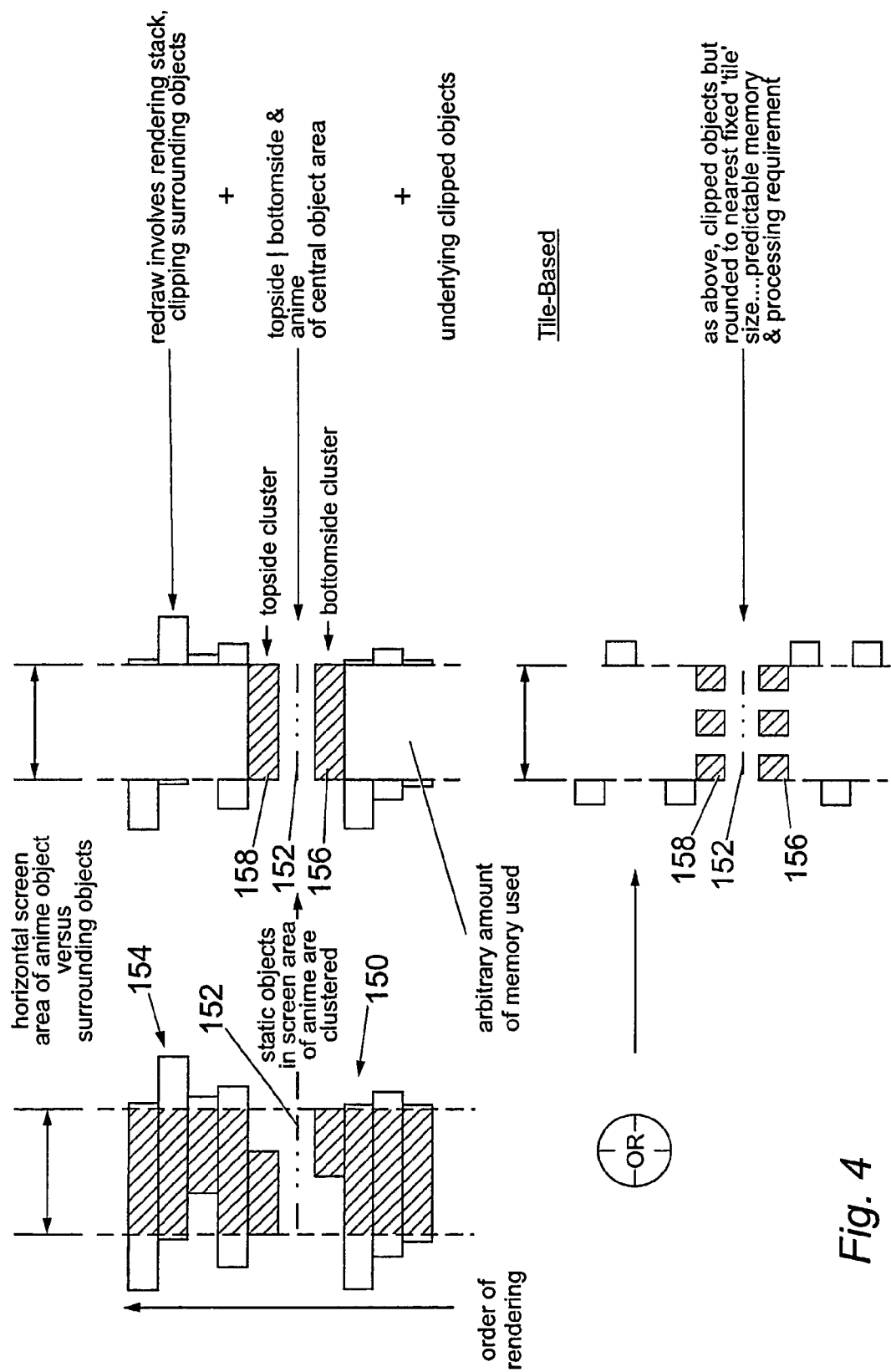
FIG. 4 is a diagram illustrating the use of tiling methods in blending graphical objects in accordance with one aspect of the invention.

As shown in FIG. 4, objects in the stack on either side of the anime 152 may overlap each other and the anime by different amounts. In this case, blending the objects involves clipping the static objects to the area of overlap with the anime 152 (the shaded areas in FIG. 4), so that the blended cluster objects 158 and 156 are clipped to the area of the anime 152.

When processing is "object-based", this requires arbitrary amounts of memory. The clustering method can be combined with tiling methods as described in co-pending International Patent Application No PCT/GB01/01742 and U.S. patent application Ser. No. 09/835,483, by rounding the clipped objects to the nearest fixed tile size, so that memory and processing requirements become predictable, thus improving memory and performance characteristics and simplifying associated code. This also applies to an alternative embodiment of the invention described below.

The efficiency of buffering processes, such as are used in the processing of the various graphic objects in the methods of the present invention, may be improved by defining the buffer content as an array of tiles 136, indexed in an ordered list. Each tile comprises a bitmap of fixed size (e.g. 32×32 or 64×64) and may be regarded as a "mini-buffer". When the required display view content changes or is clipped or moves outwith the buffer area etc., it is then only necessary to discard those tiles which are no longer required, build new tiles to cover any new display content and update the tile list. This is faster and more efficient than conventional buffering processes, since no block-copying is required within the buffer and no physical memory is required to be moved or copied.

The tiling scheme described may be used globally to provide a tile pool for all document and screen redraw operations. The tiles are used to cache the document(s) and/or objects(s) off-screen and allow rapid, efficient re-drawing of views.

The use of a tile pool as described also allows for more efficient usage of memory and processor resources. FIG. 10A shows how conventional off-screen buffering methods, involving data blocks which have arbitrary, unpredictable sizes, result in the fragmentation of memory due to unpredictable contiguous block allocation requirements. Blocks of memory required by buffering operations are mis-matched with processor memory management unit (MMU) blocks, so that re-allocation of memory becomes inefficient, requiring large numbers of physical memory copy operations, and cache consistency is impaired. By using tiles of fixed, predetermined size, memory requirements become much more predictable, so that memory and processor resources may be used and managed much more efficiently, fragmentation may be unlimited without affecting usability and the need for memory copy operations may be substantially eliminated for many types of buffering operations (FIG. 10B). Ideally, the tile size is selected to correspond with the processor MMU block size.

Figure 10C:
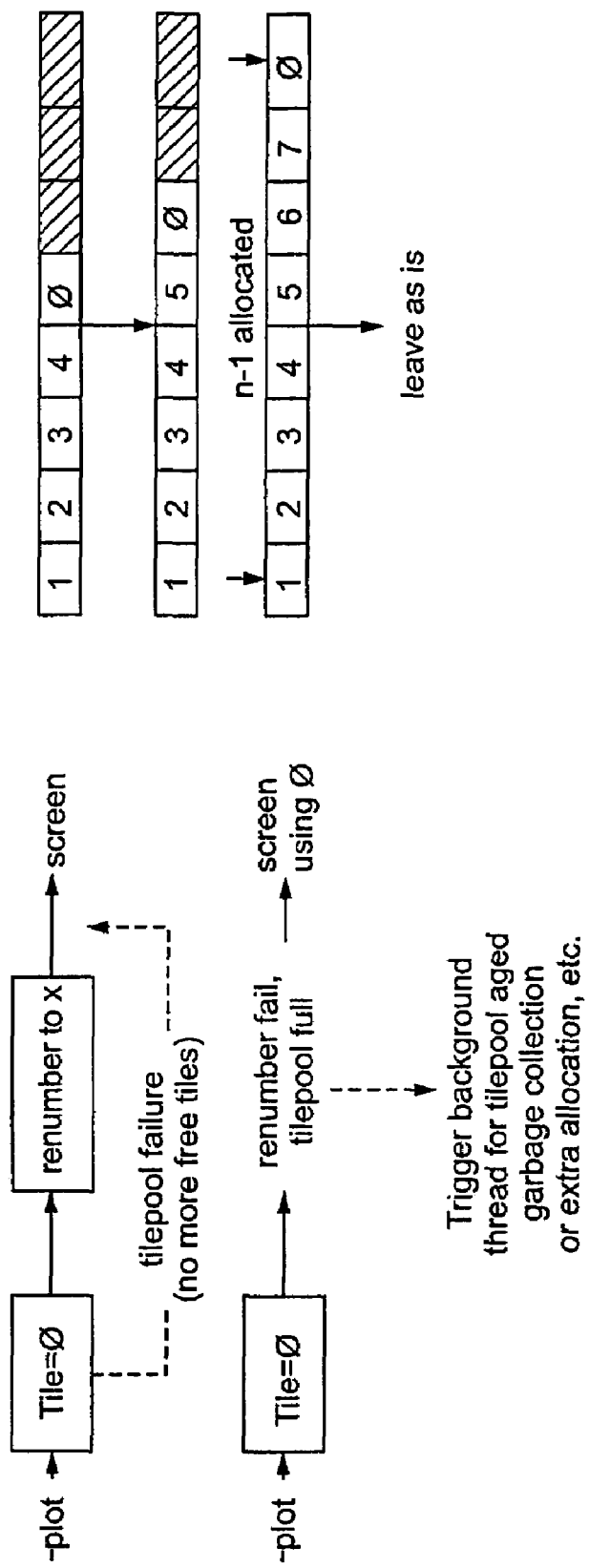
FIG. 10C is a diagram illustrating a preferred method of implementing tiling methods employed in preferred embodiments of the present invention.

FIG. 10C illustrates a preferred scheme for managing tiles within the tilepool. Tile number zero is always reserved for building each new tile. Once a new tile has been built, it is re-numbered using the next available free number (i.e. where the tilepool can accommodate a maximum of n tiles the number of tile addresses allocated is restricted to n-1). In the event of a tilepool renumbering failure, when the tilepool is full and there are no more free tiles, the new tile 0 is written directly to screen and a background process (thread) is initiated for garbage collection (e.g. identification and removal of "aged" tiles) and/or allocation of extra tile addresses. This provides an adaptive mechanism for dealing with resource-allocation failures.

Figure 11:
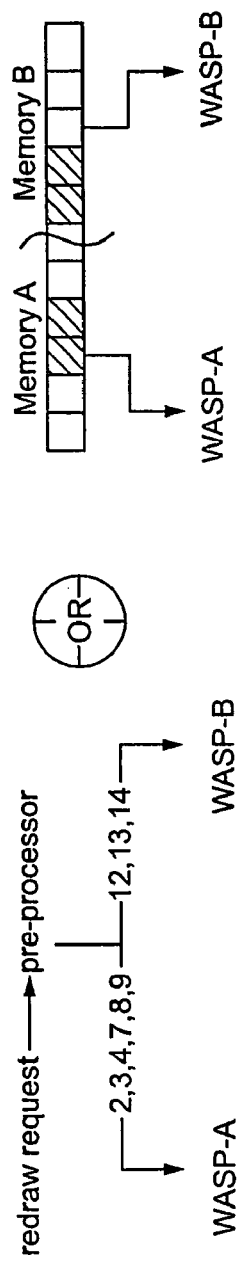
FIG. 11 is a diagram illustrating the use of multiple parallel processor modules for implementing the method of FIG. 4B.

The tiling scheme described lends itself to parallel processing, as illustrated in FIG. 11. Processing of a set of tiles can be divided between multiple parallel processes (e.g. between multiple instances of the shape processor 22 of FIG. 1). For example, a set of tiles 1-20 can be divided based on the screen positions of the tiles so that the processing of tiles 1-10 is handled by one processor WASP-A and the processing of tiles 11-20 is handled by a second processor WASP-B. Accordingly, if a redraw instruction requires tiles 1-3, 7-9 and 12-14 to be redrawn, tiles 2-4 and 7-9 are handled by WASP-A and tiles 12-14 by WASP-B. Alternatively, the set of tiles can be divided based on the location of the tiles in a tile memory map, dividing the tile memory into memory A for processing by WASP-A and memory B for processing by WASP-B.

The tiling scheme described facilitates the use of multiple buffering and off-screen caching. It also facilitates interruptable re-draw functions (e.g. so that a current re-draw may be interrupted and a new re-draw initiated in response to user input), efficient colour/display conversion and dithering, fast 90 degree (portrait/landscape) rotation of whole display in software, and reduces the redraw memory required for individual objects. Tiling also makes interpolated bitmap scaling faster and more efficient. It will also be appreciated that a system such as that of FIG. 1 may employ a common tilepool for all operating system/GUI and application display functions of a data processing system.

Figure 5:
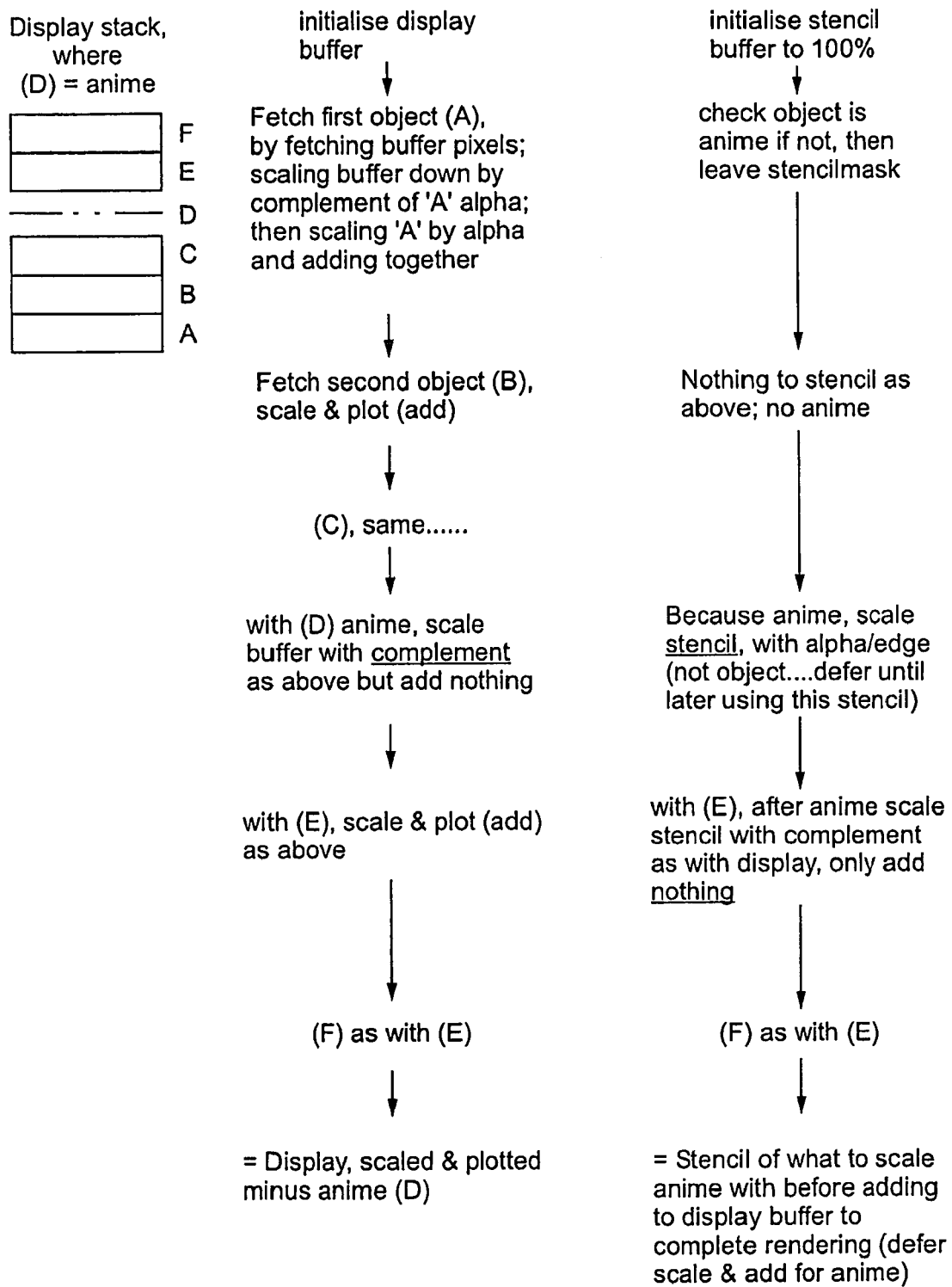
FIG. 5 is a diagram illustrating another embodiment of a method for blending graphical objects in accordance with one aspect of the invention.
Figure 6:
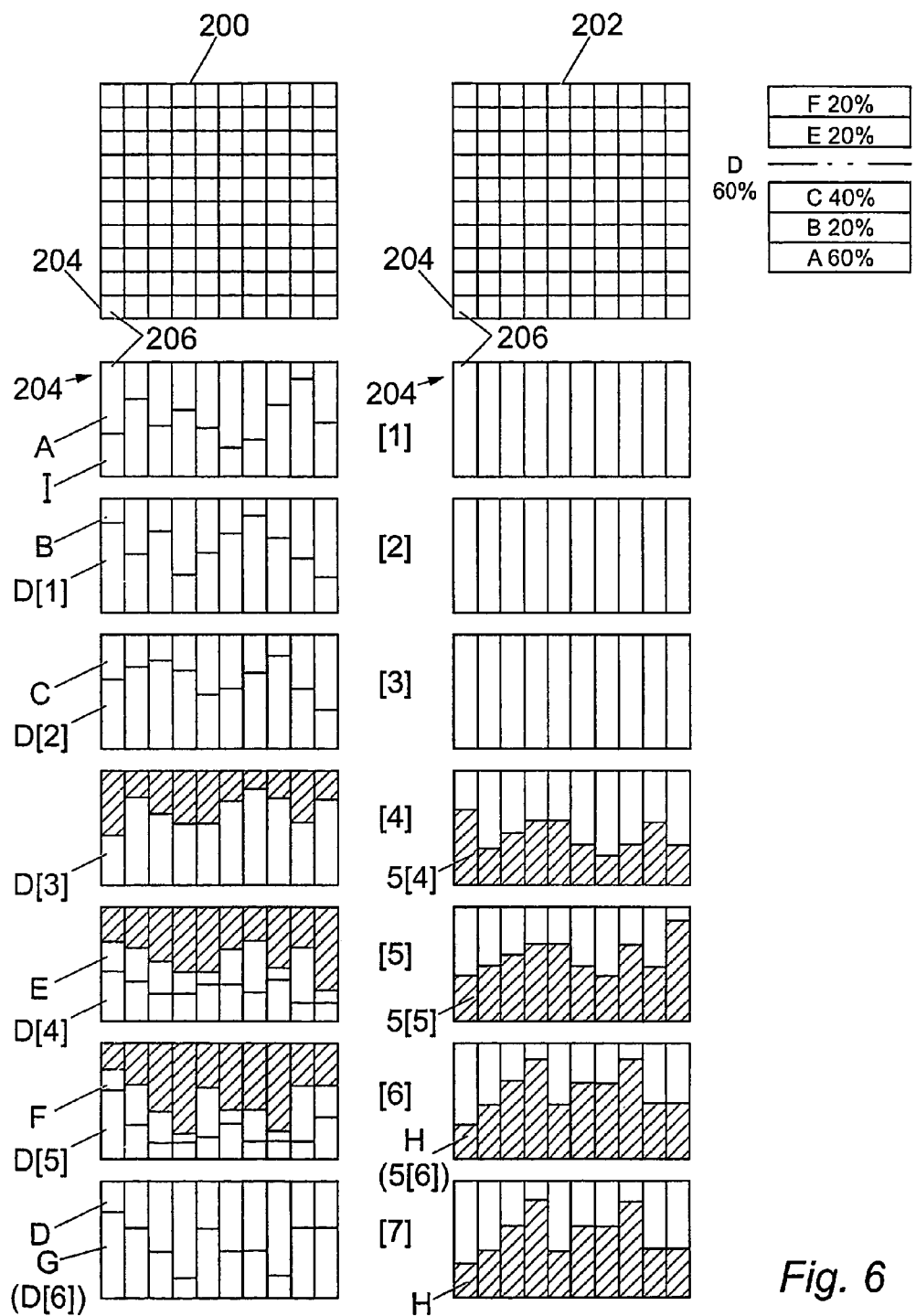
FIG. 6 is a schematic illustration showing how the contents of display and stencil buffers vary during the implementation of one example of the method of FIG. 5.

In the alternative embodiment of this aspect of the invention, all of the static objects in the stack can be combined (blended) into a single bitmap object and the anime is then blended with the single bitmap object, on the basis of a "stencil" or "mask" ("alpha-mask", where the blending parameter represents transparency, described further below), generated in the process of blending the static objects. This is illustrated in FIGS. 5, 6 and 7.

The method uses a display buffer 200 for temporary storage of composite pixel values of blended objects and one or more stencil buffers 202 for temporary storage of corresponding pixel values of stencils for use in blending one or more animes with the display buffer content representing all of the blended static objects in the object stack.

An example of this aspect of the invention will be described with reference to a stack of objects A-F (from the bottom to the top of the stack), where D is an anime and A, B, C, E and F are static objects. Each object has an associated alpha value. An object may have a single, constant alpha value, or the alpha value may vary over the area of the object (e.g. the object may have "soft edges", becoming progressively more transparent towards the edges). This applies equally to blending functions and parameters other than alpha values. The example described here relates to the most general case where the blending parameter value (alpha value in this example) of each object varies arbitrarily from pixel to pixel.

In a first stage of the process, the static objects A, B, C, E and F are blended in order from the bottom of the stack to the top, taking account of their respective pixel values (typically defining colour and saturation, or chrominance and luminance etc., in a manner depending upon the colour model employed) and alpha values, and also taking account of the alpha value of the anime D. The pixel values of the anime D are not considered during this blending of the static objects, which results in the display buffer 200 containing a single bitmap object G that is a composite derived from the pixel values of all of the static objects A, B, C, E and F and the alpha values of all of the objects A-F.

At the same time as the static objects are being blended in the display buffer 200, the stencil H is generated in the stencil buffer 202, on the basis of the alpha values of the anime D itself and of those static objects, E and F in this example, that are above the anime D in the stack. The final stencil, obtained after all of the static objects have been blended as described above, comprises a set of resultant alpha values for each pixel that reflect the transparency of the anime D relative to all of the objects in the stack and taking account of the position of the anime D within the stack.

In the final stage of the process, the pixel values of the composite bitmap G are blended with the pixel values of the anime D, using the alpha values from the stencil H, to produce a final bitmap that is a composite of all of the objects A-F. Whenever the content of the anime D changes, it is only necessary to blend the new anime content with the previously obtained bitmap G using the previously obtained stencil H.

If the transparency of the anime changes relative to the other objects then it is, of course, necessary to generate new composite bitmaps G and stencils H. A further embodiment of the invention, described below, simplifies the process of generating new composite bitmaps and stencils when the transparency (or other blending parameter) of an object is varied with time; e.g. to fade an object in or out. (An otherwise static object whose transparency or other blending parameter varies with time is, or becomes, an animated object within the terms of the definition provided above.)

The method may be adapted for multiple animes within a stack, generating a single composite bitmap G and a stencil H for each anime that take account of the transparencies and positions of each object in the stack.

The method may be better understood by reference to a specific, simplified example, as illustrated in FIGS. 5, 6 and 7.

FIG. 6 shows a 10 pixel by 10 pixel display buffer 200 and a corresponding 10×10 stencil buffer 202. Below each of the buffers, the content of each pixel of one row 204 of each buffer is illustrated schematically for each of steps [1]-[7] of the method. In the illustrations of the buffer content, the vertical direction represents the proportion of the content derived from each object and from combinations of objects. Variations in these proportions are described herein by reference to "scaling" the pixel values of the various objects and combinations on the basis of the various alpha values. The method will be described by particular reference to the left hand pixels 206 of the illustrated rows. The values shown for the other rows are entirely arbitrary, for illustration only.

FIG. 7 is a table showing how the content of the display and stencil buffers are calculated and vary for the left hand pixel of the rows in FIG. 6, assuming that the alpha values of the left hand pixels of the relevant rows of each of the objects A-F, are as follow:

| Object | Alpha Value |
|--------|-------------|
| A | 60% |
| B | 20% |
| C | 40% |
| D | 60% (anime) |
| E | 40% |
| F | 20% |

In a preliminary step (not illustrated), the content of the display buffer 200 is initialised, for example to black or white, and the stencil buffer 202 is initialised to "100%". For convenience, this initial display buffer 200 state will be referred to as an initial object I.

In each step [1]-[6], the new content of the display buffer is determined by scaling the current buffer pixel value by the complement of the alpha value of the next static object N to be blended therewith, scaling the pixel value of the object N by its own alpha value, and adding the two together. That is, in step [1] of the present example:

Resultant pixel value=(100−60) % $I$+60% $A$ $d$[1]
 =40% $I$+60% $A$

When the process reaches the anime D, the current buffer content is scaled by the complement of the anime alpha value, but nothing is added to the buffer. Thereafter, the current buffer value and the next static object value are scaled and added as before. After the final static object F has been scaled and added to the buffer, the buffer content comprises the composite static bitmap G (step [6]).

During the steps [1]-[6], the stencil buffer content remains unchanged until the anime D is reached (step [4]). The stencil value is then scaled by the alpha value of the anime. For subsequent objects (i.e. objects above the anime in the stack), the stencil value is scaled by the complement of the alpha value of each object. Once the last (topmost) object has been processed, the final stencil value H is obtained (step [6]).

Finally, in step [7], the pixel values of the anime D are scaled by the stencil values H and added to the composite bitmap values G to obtain the final, composite display including the anime content. For subsequent changes in the anime content, it is only necessary to repeat step [7] with the new anime content in order to update the display (as long as the transparency of the anime relative to the other objects does not change, when it becomes necessary to recalculate the composite bitmap G and the stencil H).

As noted above, the method is applicable to object stacks including multiple animes. The composite static bitmap G would be calculated taking account of the positions (in the stack) and transparencies of each anime, and a stencil H would be calculated for each anime, taking account of the transparency of the individual anime itself and of all static and animated objects above the anime in the stack.

It will be understood that, for the purposes of this embodiment of the invention, it is important that the scaling of the pixel values of the various objects is performed in the correct order (from the bottom to the top of the stack), so that the final composite image properly reflects the order and relative transparencies of the objects, but that the order in which the scaled values of the various objects are added together is unimportant.

This method effectively separates the two stages of the anime blending process, scaling and adding, allowing the second stage, adding, to be deferred until a frame update is performed. It is thus possible to remove previous animated object frames from a composite image simply by subtracting the scaled anime pixel values. New frames can be scaled and added while previous frames can be removed in a single step, reducing system overheads and also reducing visible display flicker which often occurs with conventional methods. This is illustrated in FIG. 8, which shows a composite display frame that initially comprises a combination of composite static content G, first anime content K and second anime content L. The first anime content K can be removed simply by subtracting its scaled pixel values from the composite display content, and can be replaced simply by adding new anime content M that has been scaled using the same stencil values as previously used for content K.

It will be understood that the composite static objects and animated object content employed in the methods of the present invention may be combined/blended in a number of different ways to generate display content and to perform updates. For example, blending may be performed independently prior to updating the current display content or blending and updating may be performed "simultaneously" by subtracting from and adding to the current display content, e.g. as described above.

Figure 9:
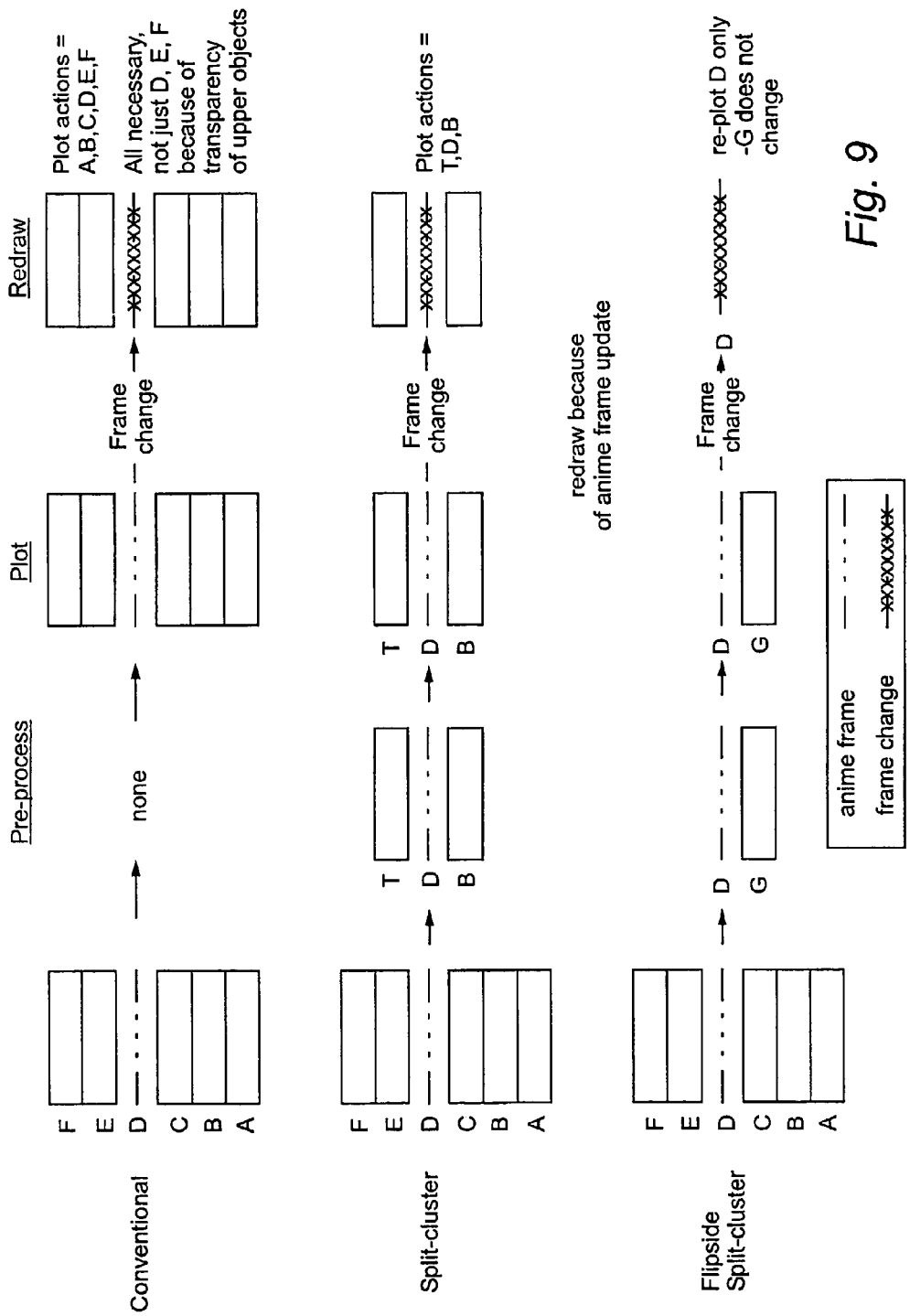
FIG. 9 is a diagram comparing a conventional object blending process with the methods of FIGS. 2 and 3 and the methods of FIGS. 5-8.

FIG. 9 compares the conventional object blending process with the "split-cluster" method of FIGS. 2 and 3 and the "flipside split-cluster" method of FIGS. 5 to 8, by reference to the same object stack as in FIG. 5. In the conventional method, every time the anime content changes it is necessary to process all of the individual objects in the stack to generate the correct new composite display output. This process is "cheap" (in terms of system resources) to initialise, because no pre-processing is required before plotting the first display frame, but is expensive for subsequent redraws because all of the objects have to be reprocessed each time.

The split-cluster method reduces groups of adjacent static objects to single objects T and B, so that each redraw only involves processing three objects T, D and B, as compared with six objects A-F in the conventional method. Initialisation is more expensive, because of the need to generate the composite static objects T and B. Note that in both the conventional and split-cluster methods, each redraw requires processing both the content and transparencies (and/or other blending parameter values) of the objects A-F and T, D, B.

The flipside split-cluster method reduces all of the static objects to a single composite static object G, and also requires the generation of the anime alpha stencil (and/or other blending parameter stencil(s)) as described above, so that initialisation is more expensive than either of the preceding methods. However, each redraw only requires the new anime content to be scaled by the value(s) of the alpha stencil and added to the single composite object G. "Blending" at this stage simply involves the scaled anime content being added to the previously determined content of the composite object G; there is no need to consider the transparency of object G. Redraws are thus cheaper than with the split-cluster method, even if the anime D is on the top or bottom of the stack (i.e. there is only one of the objects T and B).

It should further be noted that the flipside split-cluster method is advantageous even if the stack comprises only a single static object and a single anime located below the static object. The process of "flipping" the anime to the top of the stack still reduces the redraw cost. Also, both the split-cluster and flipside flip-cluster methods can still be used with stacks or clusters containing only single static objects, even if the methods do not provide any cost savings.

The foregoing examples assume a single alpha value for each object (or, in the most general case, each pixel of each object). It will be understood however that each colour component in each object/pixel may have its own alpha value. For example, if the RGB colour scheme is used, each pixel in the object will have three colour components—one each for red, green and blue (usually denoted (R, G, B)). The previous examples handle this, but by multiplying all three components by the same alpha value. However it is possible also to have different alpha values for each of the three components—one alpha value for the R component, another for the G component, and a third for the B component. The methods of the invention may be applied in substantially the same manner as before, the only extension being that there would now be three display buffers and three stencils, one set for each of R, G and B.

Alternatively the existing buffers and stencils may be viewed as arrays that are three deep. The arithmetic is unchanged—for example, when working with alphared, use the complement (1-alphared) for all the red components, etc.

This type of "chromatic blending" (as distinct from "achromatic blending", applied equally to all colour channels) has been described with reference to RGB based colour but is equally applicable to any component based colour model, such as YUV, YCC etc. It will also be understood that different blending functions can be applied independently to different colour channels in a similar manner.

As mentioned above, the "flip-order" blending methods of the present invention can be adapted for fading (varying the transparency or other blending parameter of) one or more animes (including objects that are otherwise static apart from temporal variation of the blending parameter). (Again this is applicable to both achromatic and chromatic blending, as described above).

Consider a stack of objects with an anime A somewhere in the middle, this anime having a transparency alpha. The full stack can be displayed, including A with transparency alpha or any modified transparency value, by the following method.

The flip-order algorithm described above may be used to create two sets of display buffers and stencils. The first set (D0, S0) are created using an assumed transparency value of zero for the anime A. The second set (D1, S1) are calculated with transparency value of 1 for the anime A.

Resultant display buffers (D, S) can then be created for any chosen value (t) of transparency for A, as follows:

$$D=(1-t)D0+tD1$$

$$S=(1-t)S0+tS1$$

and the final result as before comes from applying the resultant stencil to the anime A and adding the display buffer (=AS+D). When t=alpha, this produces the original effect. However faded effects can also be created rapidly simply by changing the value of t in the equation, with no need to repeat any of the blending steps that generate D0, D1, S0 or S1.

Stated more generally, this method is adapted for varying the value of a blending parameter of at least one animated object in an ordered stack of graphical objects in one or more steps, using the flip-order method as previously described. The method comprises forming first and second blending parameter stencils and first and second display buffers for the or each animated object in the stack corresponding to first and second blending parameter values or sets of blending parameter values. The blending parameter value(s) of each of said first and second stencils take account of the blending parameter value(s) of the corresponding animated object and of any objects above the corresponding animated object in the stack. For each step of varying the value of the blending parameter, a resultant blending parameter stencil and resultant display buffer content is derived from the first and second stencils and the first and second display buffers and the required parameter blending value for the current step. The resultant stencil and display buffer are then used in blending the content of the animated object and the composite static object.

Referring again to FIG. 1, the preferred system in which the methods of the invention are implemented preferably employs a device-independent colour model, suitably a luminance/chrominance model such as the CIE L*a*b* 1976 model. This reduces redundancy in graphic objects, improves data compressibility and improves consistency of colour output between different output devices. Device-dependent colour correction can be applied on the basis of the device-dependent control input 44 to the shape processor 22.

It will also be understood that the resolutions of the various objects and/or stencils employed in the methods of the present invention may differ from one another, and/or from the resolution of the final output display. Different objects may also employ different colour models. The original set of graphical objects to which the methods are applied may also include objects such as masks, stencils and filters.

FIG. 1 shows the system having an input end at which the source bytestream is received and an output end where the final output frame 24 is output from the system. However, it will be understood that the system may include intermediate inputs and outputs at other intermediate stages, such as for fetching data content or for saving/converting data generated in the course of the process.

Whilst the invention is described herein with particular reference to integrated or at least local data processing devices and systems, the invention may also be implemented in distributed systems via any type of data communications network linking one or more content sources to one or more output locations. The invention is advantageous in this context because, for example, blended objects and/or stencils need be transmitted via the network only once and only animated content updates need be transmitted subsequently, saving bandwidth and conserving network resources. Content from different sources can be blended at one or more intermediate locations for transmission to one or more end-user locations, where final blending may be performed if required.

Digital document processing systems in accordance with the second aspect of the present invention may be incorporated into a variety of types of data processing systems and devices, and into peripheral devices, in a number of different ways.

In a general purpose data processing system (the "host system"), the system of the present invention may be incorporated alongside the operating system and applications of the host system or may be incorporated fully or partially into the host operating system.

For example, the system of the present invention enables rapid display of a variety of types of data files on portable data processing devices with LCD displays without requiring the use of browsers or application programs. This class of data processing devices requires small size, low power processors for portability. Typically, this requires the use of advanced RISC-type core processors designed into ASICs (application specific integrated circuits), in order that the electronics package is as small and highly integrated as possible. This type of device also has limited random access memory and typically has no non-volatile data store (e.g. hard disk). Conventional operating system models, such as are employed in standard desktop computing systems (PCs), require high powered central processors and large amounts of memory in order to process digital documents and generate useful output, and are entirely unsuited for this type of data processing device. In particular, conventional systems do not provide for the processing of multiple file formats in an integrated manner. By contrast, the present invention may utilise common processes and pipelines for all file formats, thereby providing a highly integrated document processing system which is extremely efficient in terms of power consumption and usage of system resources.

The system of the present invention may be integrated at the BIOS level of portable data processing devices to enable document processing and output with much lower overheads than conventional system models. Alternatively, the invention may be implemented at the lowest system level just above the transport protocol stack. For example, the system may be incorporated into a network device (card) or system, to provide in-line processing of network traffic (e.g. working at the packet level in a TCP/IP system).

In a particular device, the system of the invention is configured to operate with a predetermined set of data file formats and particular output devices; e.g. the visual display unit of the device and/or at least one type of printer.

Examples of portable data processing devices which may employ the present system include "palmtop" computers, portable digital assistants (PDAs, including tablet-type PDAs in which the primary user interface comprises a graphical display with which the user interacts directly by means of a stylus device), internet-enabled mobile telephones and other communications devices, etc.

The system may also be incorporated into low cost data processing terminals such as enhanced telephones and "thin" network client terminals (e.g. network terminals with limited local processing and storage resources), and "set-top boxes" for use in interactive/internet-enabled cable TV systems.

When integrated with the operating system of a data processing system, the system of the present invention may also form the basis of a novel graphical user interface (GUI) for the operating system (OS). Documents processed and displayed by the system may include interactive features such as menus, buttons, icons etc. which provide the user interface to the underlying functions of the operating system. By extension, a complete OS/GUI may be expressed, processed and displayed in terms of system "documents". The OS/GUI could comprise a single document with multiple "chapters".

The system of the present invention may also be incorporated into peripheral devices such as hardcopy devices (printers and plotters), display devices (such as digital projectors), networking devices, input devices (cameras, scanners etc.) and also multi-function peripherals (MFPs).

When incorporated into a printer, the system may enable the printer to receive raw data files from the host data processing system and to reproduce the content of the original data file correctly, without the need for particular applications or drivers provided by the host system. This avoids the need to configure a computer system to drive a particular type of printer. The present system may directly generate a dot-mapped image of the source document suitable for output by the printer (this is true whether the system is incorporated into the printer itself or into the host system). Similar considerations apply to other hardcopy devices such as plotters.

When incorporated into a display device, such as a projector, the system may again enable the device to display the content of the original data file correctly without the use of applications or drivers on the host system, and without the need for specific configuration of the host system and/or display device. Peripheral devices of these types, when equipped with the present system, may receive and output data files from any source, via any type of data communications network.

From the foregoing, it will be understood that the system of the present invention may be "hard-wired; e.g. implemented in ROM and/or integrated into ASICs or other single-chip systems, or may be implemented as firmware (programmable ROM such as flashable ePROM), or as software, being stored locally or remotely and being fetched and executed as required by a particular device.

Improvements and modifications may be incorporated without departing from the scope of the present invention.

The invention claimed is:

1. A method of blending a plurality of mutually overlapping graphical objects in a digital document processing system, wherein said plurality of graphical objects is arranged in an ordered stack, the order being that in which the objects are to be rendered, said stack including a plurality of static objects and at least one animated object, each of said objects comprising graphical content and having at least one blending parameter comprising at least one alpha value representing the transparency of at least part of the object associated therewith, the method comprising:
   (a) organizing the static objects into clusters comprising a first cluster of those static objects lying below the animated object in the ordered stack, and a second cluster of those static objects lying above the animated object in the ordered stack;
   (b) for each of said first and second clusters, blending the content of said static objects within the cluster to form first and second composite static objects, taking account of the respective blending parameters of the static objects;
   (c) blending the content of the animated object and the first and second composite static objects, taking account of the blending parameter(s) of the animated object to produce an image;
   (d) repeating step (c) using the previously obtained first and second composite static objects formed in step (b) when the content of the animated object changes to produce an undated image; and
   (e) storing or presenting to a user images produced in steps (c) and (d).

2. The method of claim 1, wherein current display content formed in step (c) using first animated object content is replaced by new display content formed by blending second animated object content and the previously obtained composite static objects formed in step (b).

3. The method of claim 1, wherein current display content formed in step (c) using first animated object content is updated by subtracting the first animated content from the current display content and adding second animated object content.

4. A method as claimed in claim 1, wherein said at least one blending parameter is an achromatic blending parameter applicable to all colour channels of the object associated therewith.

5. A method as claimed in claim 1, wherein said at least one blending parameter comprises a plurality of chromatic blending parameter values, each chromatic blending parameter value being applicable to at least one colour channel of the object associated therewith.

6. A method as claimed in claim 1, including dividing said graphical objects and composite objects into a plurality of bitmap tiles of fixed, predetermined size and storing said tiles in an indexed array.

7. A method as claimed in claim 6, including selectively clipping at least one of said objects by rounding to the nearest tile size.

8. A method as claimed in claim 6, wherein current content of said graphical objects is updated by removing redundant tiles from said selected set and adding new tiles to said selected set.

9. A method as claimed in claim 6, including processing subsets of said tiles in parallel.

10. A method as claimed claim 1 wherein said objects and content are assembled from a plurality of bitmap tiles of fixed, predetermined size.

11. A method as claimed in claim 1, wherein said graphical objects originate from at least one content source for transmission to at least one output location via a data communications network, and wherein the blending steps (b) and (c) are performed at least partially at one of the at least one of said content sources, at least one of said output locations, and at least one intermediate location.

12. A method according to claim 1, further comprising:
carrying out steps (a) and (b) to form the first and second composite static objects at a first computer;
transmitting the first and second composite static objects and the animated object over a network to a second computer;
carrying out step (c) to form the image at the second computer;
when the content of the animated object changes sending only the changed animated object over the network to the second computer; and
in step (d), repeating step (c) at the second computer using the previously transmitted composite static objects and the newly-transmitted changed animated object.

13. A method of blending a plurality of mutually overlapping graphical objects in a digital document processing system, wherein said plurality of graphical objects is arranged in an ordered stack, the order being that in which the objects are to be rendered, the stack includes a plurality of static objects and a plurality of animated objects, each of said objects comprising graphical content and having at least one blending parameter comprising transparency for at least part of the object associated therewith, the method comprising:
(a) organizing the static objects into clusters comprising a first cluster of those static objects lying below a bottom-most animated object in the ordered stack, a second cluster of those static objects lying above a top-most animated object in the ordered stack, and at least one further cluster of those static objects lying between two consecutive animated objects in the ordered stack;
(b) blending the content of said static objects within each of said first, second, and further clusters to form a respective composite static object for each cluster, taking account of the respective blending parameters of the static objects;
(c) assigning a rendering order to each of the composite static objects and the animated objects in the stack, the rendering order of each composite static object being determined by the location in the stack of the cluster of static objects from which the respective composite static object was formed;
(d) blending the content of the animated objects and the composite static objects, taking account of the blending parameter(s) of the animated object and of the assigned rendering order to produce an image;
(e) repeating step (d) using the previously obtained composite static objects formed in step (b) when the content of at least one of the animated objects changes to produce an undated image; and
(f) storing or presenting to a user images produced in steps (d) and (e).

14. A method of blending a plurality of mutually overlapping graphical objects in a digital document processing system, wherein said plurality of graphical objects is arranged in an ordered stack that includes at least one static object and at least one animated object, each of said objects comprising graphical content and having at least one blending parameter for at least part of the object associated therewith, the method comprising:
(a) blending the content of all of the static objects in the stack into a single composite static object, taking account of the relative blending parameters of all of the static and animated objects in the stack, and forming a blending parameter value stencil for the or each animated object in the stack, the blending parameter value(s) of the or each stencil taking account of the blending parameter value(s) of the corresponding animated object and of any objects above the corresponding animated object in the stack;
(b) blending the content of the or each animated object with the composite static object on the basis of the corresponding blending parameter value stencil to produce an image;
(c) repeating step (b) using the previously obtained composite static object and stencil(s) formed in step (a) when the content of the animated object changes to produce an updated image; and
(d) storing or presenting to a user images produced in steps (b) and (c).

15. The method of claim 14, wherein the objects are blended in a display buffer, and including: processing the objects in order from the bottom to the top of the stack by scaling the current content of the display buffer by the complement of the blending parameter value of the next object in the stack, and where the next object in the stack is a static object, scaling the content of that static object by its own blending parameter value, and adding the scaled content of that static object to the scaled content of the display buffer.

16. The method of claim 15, wherein a blending parameter value stencil for each animated object is formed in a stencil buffer, and including: where the next object in the stack is that animated object corresponding to the stencil buffer, scaling the blending parameter value(s) of the stencil by the blending parameter value(s) of the animated object, and where the next object in the stack is above the animated object corresponding to the stencil buffer, scaling the current blending parameter value(s) of the stencil buffer by the complement of the blending parameter value(s) of that next object.

17. The method of claim 16, wherein step (b) comprises scaling the content of the animated object by the blending parameter value(s) of the corresponding stencil and adding the scaled animated object content to the composite, scaled static object content of the display buffer.

18. The method of claim 17, wherein current display content is updated by scaling new animated object content using the previously obtained blending parameter value stencil and adding the new scaled animated object content to the previously obtained composite static object.

19. The method of claim 17, wherein current display content is updated by scaling new animated object content using the previously obtained blending parameter value stencil, subtracting the current scaled animated object content from the current display content and adding the new scaled animated object content.

20. The method of claim 15, adapted for varying the value of a blending parameter of at least one animated object in an ordered stack of graphical objects in one or more steps, comprising forming first and second blending parameter stencils and first and second display buffers for the or each animated object in the stack corresponding to first and second blending parameter values or sets of blending parameter values, the blending parameter value(s) of each of said first and second stencils taking account of the blending parameter value(s) of the corresponding animated object and of any objects above the corresponding animated object in the stack and, for each step of varying the value of the blending parameter, deriving a resultant blending parameter stencil and resultant display buffer content from the first and second stencils and the first and second display buffers and the required parameter blending value for the current step, for use in said step (b).

21. The method of claim 20, wherein the first stencil, S0, and the first display buffer, D0, are created using a blending parameter value of zero and the second stencil, S1, and the second display buffer, D1, are created using a blending parameter value of 1, and wherein the resultant stencil, S, and the resultant display buffer content, D, are calculated for the required parameter blending value, t, of the current step as follows:

$$D=(1-t)D0+tD1$$

$$S=(1-t)S0+tS1.$$

22. A digital document processing system for blending a plurality of mutually overlapping graphical objects, wherein said plurality of graphical objects is arranged in an ordered stack, the order being that in which the objects are to be rendered, said stack including a plurality of static objects and at least one animated object, each of said objects comprising graphical content and having at least one blending parameter comprising at least one alpha value representing the transparency of at least part of the object associated therewith, comprising:
  (a) means for organizing the static objects into clusters comprising a first cluster of those static objects lying below the animated object in the ordered stack, and a second cluster of those static objects lying above the animated object in the ordered stack;
  (b) means for blending the content of said static objects within each of said first and second clusters to form a first and second composite static object, taking account of the respective blending parameters of the static objects;
  (c) means for blending the content of the animated object and the first and second composite static objects to produce an image, taking account of the blending parameter(s) of the animated object, and for causing said blending to be repeated using the previously obtained first and second composite static objects formed in step (b) when the content of the animated object changes to produce an updated image; and
  (d) means for storing or presenting to a user images produced in step (c).

23. A system as claimed in claim 22, comprising: an input mechanism for receiving an input bytestream representing source data in one of a plurality of predetermined data formats; an interpreting mechanism for interpreting said bytestream; a converting mechanism for converting interpreted content from said bytestream into an internal representation data format; and a processing mechanism for processing said internal representation data so as to generate output representation data adapted to drive an output device.

24. A system as claimed in claim 23, wherein said source data defines the content and structure of a digital document, and wherein said internal representation data describes said structure in terms of generic objects defining a plurality of data types and parameters defining properties of specific instances of generic objects, separately from said content.

25. A system as claimed in claim 24, further including a library of generic object types, said internal representation data being based on the content of said library.

26. A system as claimed in claim 24, including a parsing and rendering module adapted to generate an object and parameter based representation of a specific view of at least part of said internal representation data, on the basis of a first control input to said parsing and rendering module.

27. A system as defined in claim 26, further including a shape processing module adapted to receive said object and parameter based representation of said specific view from said parsing and rendering module and to convert said object and parameter based representation into an output data format suitable for driving a particular output device.

28. A system as claimed in claim 27, wherein said shape processing module processes said objects on the basis of a boundary box defining the boundary of an object, a shape defining the actual shape of the object bounded by the boundary box, the data content of the object and the transparency of the object.

29. A system as claimed in claim 28, wherein said shape processing module is adapted to apply grey-scale anti-aliasing to the edges of said objects.

30. A system as claimed in claim 27, wherein said shape processing module has a pipeline architecture.

31. A system as claimed in claim 24, wherein said object parameters include dimensional, physical and temporal parameters.

32. A system as claimed in claim 23, wherein the system employs a chrominance/luminance-based colour model to describe colour data.

33. A system as claimed in claim 23, wherein the system includes means for multiple parallel implementation in whole or in part for processing one or more sets of source data from one or more data sources and for generating one or more sets of output representation data.

34. A graphical user interface for a data processing system in which interactive visual displays employed by the user interface are generated by means of a digital document processing system as claimed in claim 22.

35. A data processing device incorporating a graphical user interface as claimed in claim 34.

36. A hardware device for data processing and/or storage encoding a digital document processing system as claimed in claim 22.

37. A hardware device as claimed in claim 36, further including a core processor system.

38. A hardware device as claimed in claim 37, wherein said core processor is a RISC processor.

39. A data processing system including a digital document processing system as claimed in claim 22.

40. A data processing system as claimed in claim 39, wherein said data processing system comprises a portable data processing device.

41. A data processing system as claimed in claim 40, wherein said portable data processing device comprises a wireless telecommunications device.

42. A data processing system as claimed in claim 39, wherein said data processing system comprises a network user-terminal.

43. A peripheral device for use with a data processing system, including a digital document processing system as claimed in claim 22.

44. A peripheral device as claimed in claim 43, wherein said peripheral device is a visual display device.

45. A peripheral device as claimed in claim 43, wherein said peripheral device is a hardcopy output device.

46. A peripheral device as claimed in claim 43, wherein said peripheral device is an input device.

47. A peripheral device as claimed in claim 43, wherein said peripheral device is a network device.

48. A peripheral device as claimed in claim 43, wherein said peripheral device is a multi-function peripheral device

* * * * *

UNITED STATES PATENT AND TRADEMARK OFFICE
CERTIFICATE OF CORRECTION

PATENT NO. : 7,271,814 B2
APPLICATION NO. : 10/492472
DATED : September 18, 2007
INVENTOR(S) : Majid Anwar et al.

It is certified that error appears in the above-identified patent and that said Letters Patent is hereby corrected as shown below:

Title page, item (73) "Assignee"

delete
"Picsel Technologies, Ltd."

and insert
--Picsel (Research) Limited--.

Signed and Sealed this

Fifth Day of May, 2009

JOHN DOLL
*Acting Director of the United States Patent and Trademark Office*